UNITED STATES PATENT OFFICE.

JACOB REESE, OF PITTSBURG, PENNSYLVANIA.

PHOSPHATIC FERTILIZER.

SPECIFICATION forming part of Letters Patent No. 450,255, dated April 14, 1891.

Application filed February 18, 1889. Serial No. 300,295. (No specimens.)

*To all whom it may concern:*

Be it known that I, JACOB REESE, a citizen of the United States, residing at Pittsburg, Pennsylvania, have invented a new and useful Improvement in Potassic Ammoniated Phosphates; and I declare the following to be a full, clear, and exact description thereof.

It is now a well-established fact that phosphoric acid, potash, and ammonia are the great essential elements in plant-food. Heretofore in preparing this triple compound it has been the general practice to dissolve bones or phosphatic rock with sulphuric acid, then admixing salts of potash and ammonia, while sometimes the mixture is first made and subjected to the action of sulphuric acid while others subject the material to furnacing of a high temperature before and after mixing.

I have discovered that by using the calcareous phosphatic basic slag produced in the manufacture of steel by the Reese basic process as a phosphate and admixing therewith potash and ammonia a first-class potassic ammoniated phosphate may be produced without the aid of phosphoric acid or furnacing at any temperature.

In the practice of my invention I take calcareous phosphatic basic slag produced by the Reese steel basic process and crush, grind, and pulverize it, care being taken to separate all particles of metallic iron, as the iron will be injurious to the grinding machinery and objectionable as plant-food. When the slag has been thus treated until reduced to powder, preferably so fine that it will pass through a sieve having ten thousand holes to the square inch, it is admixed with the salt, such as the sulphate or other material containing potash and ammonia which has been previously pulverized. This compound is then thoroughly mixed in the dry state and is ready for use.

It will be observed that I do not use sulphuric acid nor subject the material to furnacing at any temperature in producing this potassic ammoniated phosphatic plant-food. The acid being very objectionable, as it eats the bags, rusts the drills, and if present in large degrees rots the grain when drilled together, while the furnacing tends to vaporize the ammonia.

What I claim, and desire to secure by Letters Patent, is—

A fertilizer composed, essentially, of pulverized calcareous phosphatic basic slag, potash, and ammonia, as set forth.

JACOB REESE.

Witnesses:
JOHN C. PENNIE,
HERBERT W. ELMORE.